United States Patent [19]
Lee

[11] 3,755,777
[45] Aug. 28, 1973

[54] IGNITION CODE OVERRIDE DEVICE

[76] Inventor: Joseph K. Lee, 10616 Bramblebush, Whittier, Calif. 90604

[22] Filed: Aug. 12, 1971

[21] Appl. No.: 171,191

Related U.S. Application Data

[63] Continuation-in-part of Ser. No. 67,486, Aug. 27, 1970, abandoned, which is a continuation-in-part of Ser. No. 875,450, Nov. 10, 1969, Pat. No. 3,618,009, which is a continuation-in-part of Ser. No. 711,269, March 7, 1968, Pat. No. 3,541,505.

[52] U.S. Cl. .................... 340/64, 200/45, 180/114
[51] Int. Cl. ............................................. B60r 25/10
[58] Field of Search ................ 340/63, 64; 180/114; 200/42–45, 61–66

[56] References Cited
UNITED STATES PATENTS

| | | | |
|---|---|---|---|
| 2,295,178 | 9/1942 | Kolias | 340/64 |
| 3,541,505 | 11/1970 | Lee | 340/64 |
| 3,618,009 | 11/1971 | Lee | 340/64 |
| 3,691,396 | 9/1972 | Henrichs | 340/64 X |

Primary Examiner—Alvin H. Waring
Attorney—Walter G. Maxwell et al.

[57] ABSTRACT

An automobile anti-theft system has an override mechanism for the ignition lock normally to prevent insertion of the ignition key into the lock. A number of pushbuttons located on the instrument panel are labeled to identify a secret code, and the bushbuttons are electrically coupled to the override mechanism to disable the mechanism when the proper code is selected. The pushbuttons are also electrically coupled to an alarm so that selecting an improper code activates the alarm.

4 Claims, 13 Drawing Figures

INVENTOR.
JOSEPH K. LEE
BY
Christie, Parker & Hale
ATTORNEYS

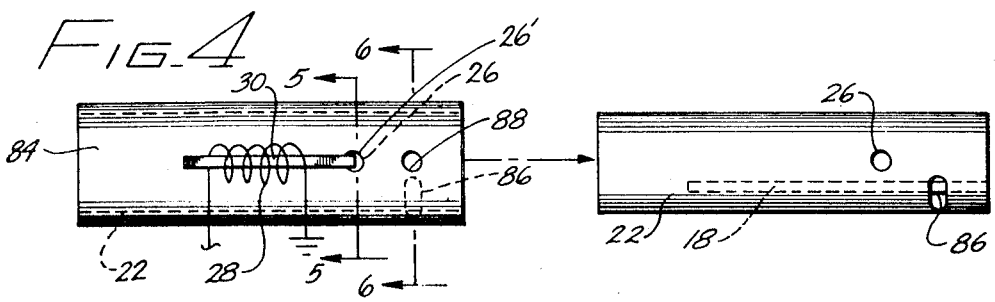
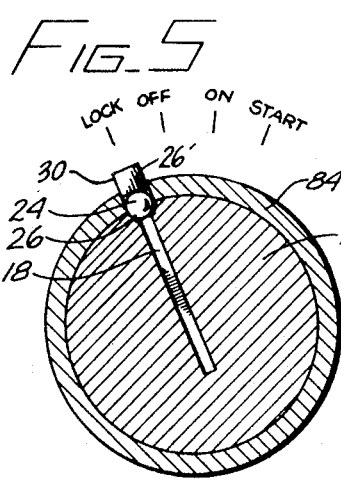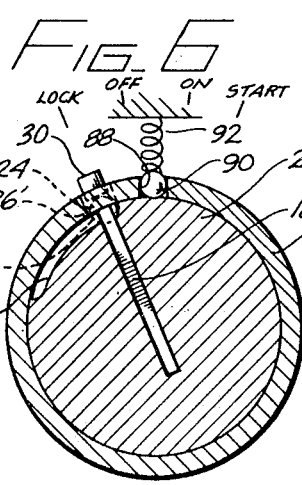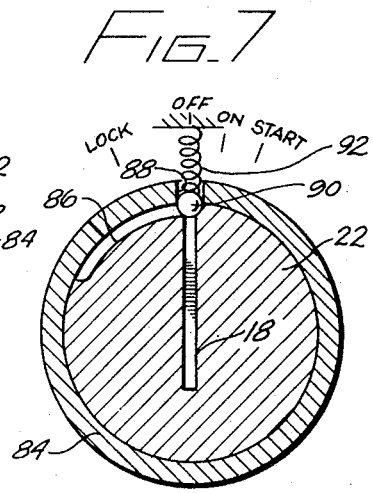
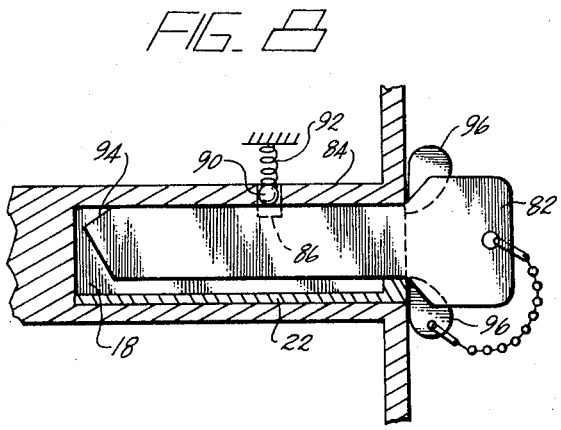

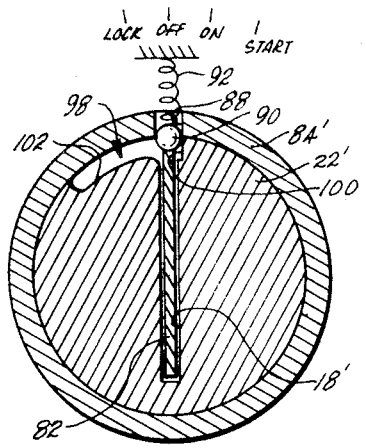
FIG_9
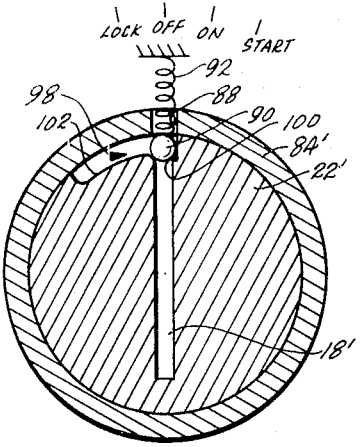
FIG_11
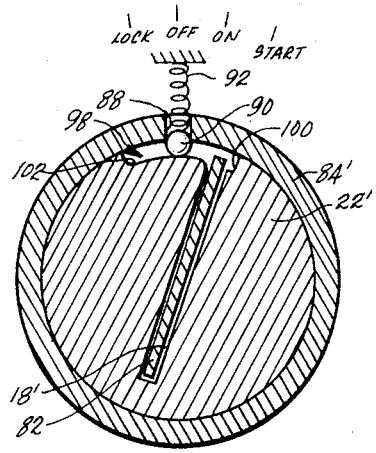
FIG_10
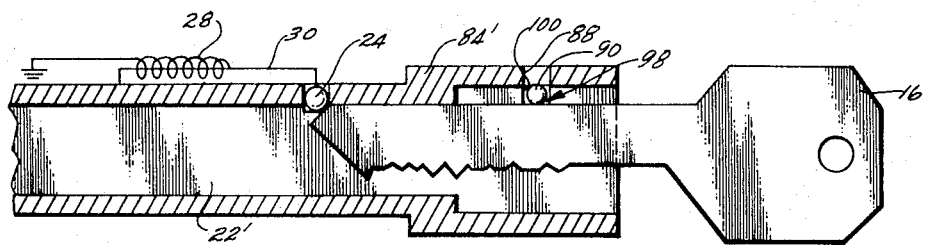
FIG_12
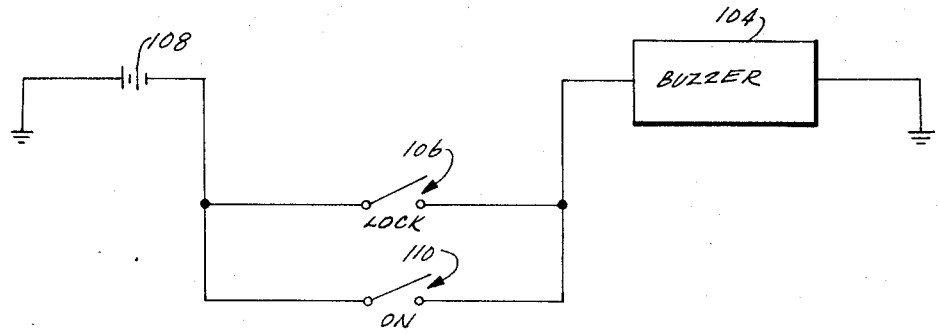
FIG_13

IGNITION CODE OVERRIDE DEVICE

CROSS-REFERENCE TO RELATED APPLICATIONS

This application is a continuation-in-part of my application Ser. No. 67,486, filed Aug. 27, 1970, now abandoned which is a continuation-in-part of my application Ser. No. 875,450, filed Nov. 10, 1969, now U.S. Pat. No. 3,618,009, which in turn is a continuation-in-part of my application Ser. No. 711,269, filed Mar. 7, 1968, now U.S. Pat. No. 3,541,505.

BACKGROUND OF THE INVENTION

1. Field of the Invention

This invention relates to automobile anti-theft systems, and more particularly, to a system which includes an override mechanism responsive to selection of a secret code for controlling operation of an automobile ignition lock. The system is further adapted to activate a warning device in the event an improper code is selected.

2. Description of the Prior Art

A variety of automobile anti-theft systems have been developed in recent years. A substantial number of these systems include some type of warning device such as an alarm, a buzzer, or a panel light activated when the driver leaves his key in the ignition lock. Anti-theft systems of this type are satisfactory in preventing a substantial number of automobile thefts, but they are generally not capable of preventing thefts when an unauthorized person has possession of the automobile owner's ignition key. Therefore, it is desirable to provide an automobile anti-theft system which not only alerts the driver to remove his key from the ignition lock, but which also prevents an unauthorized person from starting an automobile even when he has the proper ignition key in his possession.

SUMMARY OF THE INVENTION

This invention provides an automobile anti-theft system which includes an override mechanism for normally preventing insertion of an ignition key into the key barrel of an automobile ignition lock. The system further includes apparatus responsive to selection of a secret code known to the owner of the automobile for disabling the override mechanism to permit the key to be inserted into the ignition lock. Thus, an unauthorized person not informed of the proper code cannot start the automobile even though he has the ignition key in his possession. The system can also be adapted to include an alarm activated in the event an unauthorized person uses an improper code combination to disable the override mechanism.

Briefly, this invention contemplates a key-operated automobile ignition lock with locking means movable between a normally locked position preventing passage of the ignition key into the key barrel of the lock and an unlocked position permitting passage of the key into the barrel. A plurality of selectively operable sensing means preferably in the form of pushbuttons mounted on the automobile instrument panel define both properly selected sensing means preferably identified by a predetermined code and improperly selected sensing means. An electrical lock control circuit connected to the locking means is operable in response to actuation of the sensing means bearing the predetermined code to move the locking means from its normally locked position to its unlocked position to thereby allow insertion of the key into the key barrel. The electrical lock control circuit is inoperable when the improperly selected sensing means are actuated, thereby maintaining the locking element in its locked position preventing insertion of the ignition key into the key barrel.

Preferably, the locking means includes a movable locking element movable between the normally locked position in the key barrel and the unlocked position permitting passage of the key into the barrel. In the preferred form of the invention the locking means further includes movable retaining means arranged to cooperate with the locking element to maintain the locking element in its locked position. Preferably, the retaining means comprises a solenoid having a reciprocable plunger normally disposed to prevent movement of the locking element from its locked position. The solenoid is connected to the electrical lock control circuit so that actuation of the sensing means bearing the predetermined code moves the plunger to a disabled position permitting movement of the locking element to its unlocked position.

Preferably, the invention further includes an alarm and an electrical alarm control circuit connected to the alarm operable to activate the alarm in response to actuation of the improperly selected sensing means. An electrical intercoupling circuit connected to the electrical alarm control means is operable in response to actuation of the properly selected sensing means for activating the alarm in the event the properly selected sensing means are not selected in a predetermined sequence. When the proper code combination is selected and the key is inserted into the ignition lock, an electrical circuit preferably disables the alarm to prevent it from being activated so long as the key remains in the lock. An electrical reset circuit is preferably provided for returning both the retaining means to its normal position and the locking element to its locked position when the key is removed from the key barrel.

BRIEF DESCRIPTION OF THE DRAWINGS

These and other aspects of the invention will be more fully understood from the following description and the accompanying drawings, in which:

FIG. 4 is a schematic plan elevation showing a key barrel inside an outer barrel and means for locking the key barrel from rotation relative to the outer barrel;

FIG. 5 is a schematic sectional elevation taken on line 5—5 of FIG. 4;

FIG. 6 is a schematic sectional elevation taken on line 6—6 of FIG. 4;

FIG. 7 is a schematic sectional elevation showing the key barrel locked to prevent counterclockwise rotation relative to the outer barrel;

FIG. 8 is a schematic elevation taken on line 8—8 of FIG. 7 showing a dummy key inserted in the key barrel.

FIG. 9 is a schematic sectional elevation, partly broken away, showing an alternate embodiment of the key barrel and outer barrel arrangement shown in FIGS. 4 through 8, with a dummy key in the key barrel;

FIG. 10 is a schematic sectional elevation showing the key barrel arrangement of FIG. 9 rotated to the "on" position;

FIG. 11 is a schematic sectional elevation showing the key barrel arrangement of FIG. 9 with the dummy key removed;

FIG. 12 is a sectional side elevation showing the alternate key barrel and outer barrel arrangement in the "lock" position with an ignition key partially inserted into the key barrel; and FIG. 13 is a schematic circuit diagram showing a system for warning the automobile owner to remove his ignition key from the key barrel.

DETAILED DESCRIPTION OF THE PREFERRED EMBODIMENT

Figure 1:
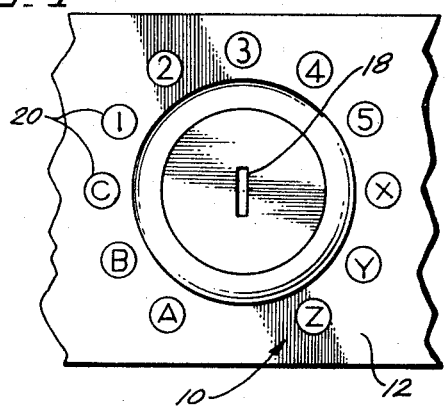
FIG. 1 shows a series of alphanumeric pushbuttons in combination with a conventional key-operated automobile ignition lock.

Referring to the drawings, a conventional automobile ignition lock 10 mounted on an instrument panel or dashboard 12 of an automobile (not shown) is adapted to open and close an ignition switch 14 in response to rotation of an ignition key 16 which fits into a key slot 18 in ignition lock 10. Sensing means including a series of alphabetically or numerically labeled pushbuttons 20 are circumferentially disposed about the outer perimeter of ignition lock 10. Preferably, each pushbutton is identified by a respective number 1 through 5 or a respective letter A, B, C, X, Y, or Z. These numbers and letters can be combined in any suitable combination to provide a secret code known to the owner of the automobile. In accordance with this invention, the automobile ignition system is adapted in a manner hereinafter described to require that knowledge of the code be indicated by punching the appropriate pushbuttons before ignition lock 10 will accept ignition key 16. Although it is preferred to mount pushbuttons 20 in close proximity to ignition lock 10 as shown in FIG. 1, pushbuttons or other equivalent means for sensing knowledge of the secret code can be disposed in any suitable arrangement and located at any desirable place within the automobile without departing from the scope of this invention. Further, although the combination of independent and distinct alphabetical and numerical symbols shown in FIG. 1 is preferred, any desired combination of symbols can be used.

Figure 2:
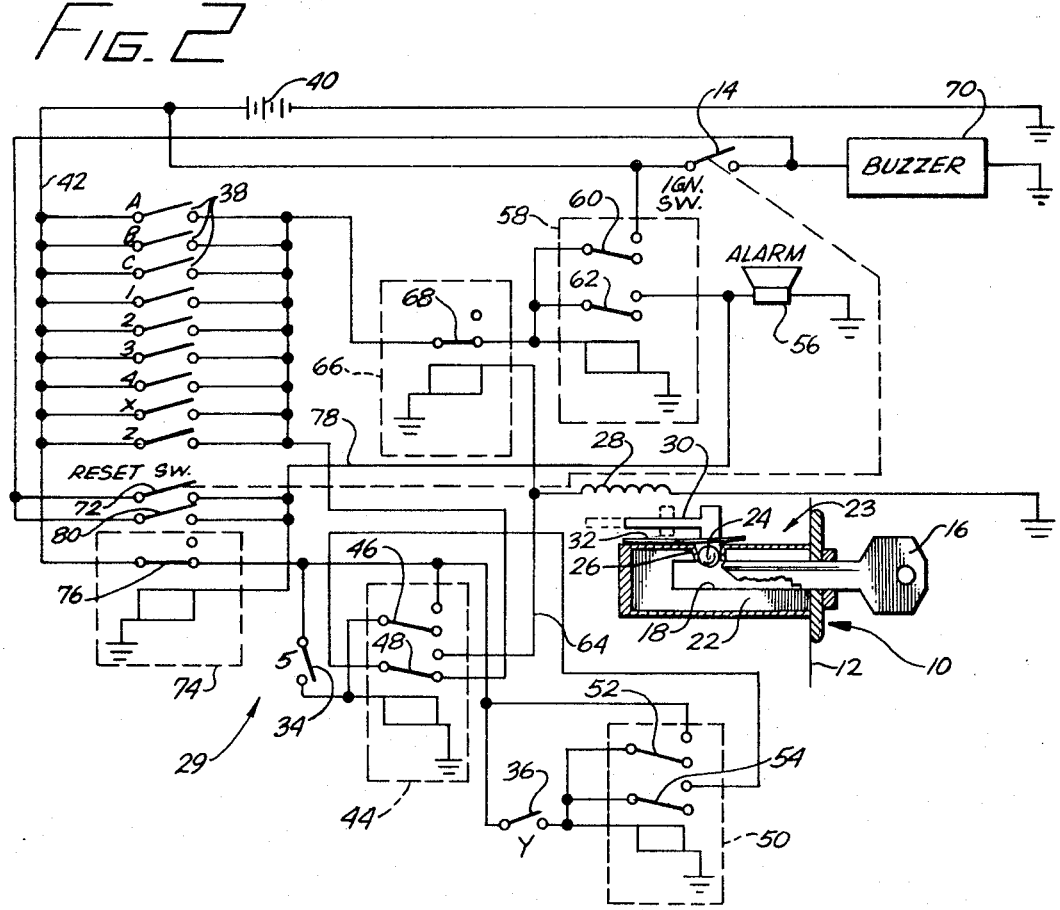
FIG. 2 is a schematic circuit diagram showing the automobile ignition switch control and alarm system of this invention in its normally deactivated condition preventing insertion of a key into an automobile ignition lock.
Figure 3:
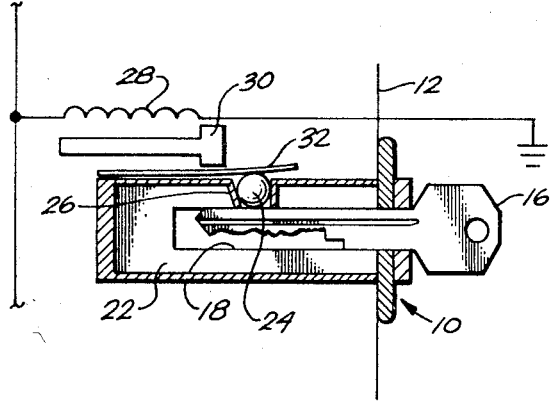
FIG. 3 is a schematic view showing the ignition lock of FIG. 2 in its activated condition permitting passage of the key into the ignition lock.

The operation of the ignition switch control and alarm system of this invention may be understood by referring to FIG. 2. Key slot 18 extends longitudinally into an elongated transversely circular rotatable key barrel 22. When ignition key 16 is inserted into key slot 18 and key barrel 22 is rotated to the ignition on position, ignition switch 14 closes. An ignition lock override mechanism 23 includes a locking element preferably in the form of a small metal ball 24 adapted to move in a groove or channel 26 extending radially upwardly from key slot 18 to the exterior of key barrel 22. Retaining means in the form of a solenoid 28 disposed longitudinally adjacent to the exterior of key barrel 22 is connected to an electrical ignition switch control circuit 29 hereinafter described in detail. The solenoid includes an elongated reciprocable plunger 30 normally extending outwardly from the solenoid when the solenoid is not energized by ignition switch control circuit 29. An elongated keeper lever 32 constructed from a flat strip of resilient material is disposed between plunger 30 and the exterior of key barrel 22 so that it covers the exterior opening of radial channel 26. The bottom exterior surface of plunger 30 abuts against the upper surface of keeper lever 32, and when the plunger is in its extended position as shown in FIG. 2, the plunger forces keeper lever 32 down over the outer opening of radial channel 26 to keep metal ball 24 in a locked position locked against movement relative to the channel. In its locked position, metal ball 24 prevents ignition key 16 from being inserted into key slot 18. When solenoid 28 is energized by ignition switch control circuit 29, plunger 30 retracts into the solenoid as shown in FIG. 3 to disable override mechanism 23 by allowing keeper lever 32 to move relative to the outer opening of radial channel 26. In use when plunger 30 is in its retracted position, insertion of ignition key 16 into key slot 18 is permitted because pushing of the key into the slot forces movable metal ball 24 upwardly in radial channel 26 away from its locked position.

Further structural details of ignition lock override mechanism 23 are not emphasized herein because of the similarity to my automobile alarm system described in my copending application Ser. No. 711,269, filed Mar. 7, 1968, now U.S. Pat. No. 3,541,505. In that alarm system a radially movable mechanical element similar to metal ball 24 is disposed in the key barrel of an automobile ignition lock and is responsive to the presence of a key in the lock for activating a solenoid which controls an automobile door lock mechanism.

In the following description of electrical control circuit 29 it is assumed for the purposes of explanation that the proper code combination selected from pushbuttons 20 for use in disabling override mechanism 23 is 5-Y; that is, the pushbuttons labeled 5 and Y must be punched in sequence to retract plunger 30 of the override mechanism. The means for sensing selection of the proper code combination include a first lock control switch 34 and a second lock control switch 36 respectively closed when the pushbuttons labeled 5 and Y are punched. Each of the remaining pushbuttons, those labeled A, B, C, 1 through 4, X, and Z, are adapted to close a respective switch 38 when actuated. These pushbuttons provide means for sensing an improper selection of the secret code combination and are not adapted to disable override mechanism 23.

Electrical ignition switch control circuit 29 includes a power source, preferably a conventional automobile storage battery 40 having one terminal grounded and the other terminal connected to a lead line 42. First lock control switch 34 is connected directly to lead line 42 so that in use first lock control relay 44 is energized as the switch 34 is closed by the actuation of pushbutton 5. First relay 44 includes a first armature 46 movable from an initially open position to a closed position when the relay 44 is energized. In its closed position first armature 46 connects first relay 44 directly to storage battery 40 so that relay 44 is locked in an energized condition even though first lock control switch 34 returns to is open position after pushbutton 5 is activated. First lock control relay 44 further includes a second armature 48 movable from an initially closed position to a second closed position for a purpose hereinafter described. Second lock control switch 36 is connected directly to lead line 42 so that in use a second lock control relay 50 is energized as the switch 36 is closed by the actuation of pushbutton Y. Second relay 50 includes a first armature 52 movable from an intially open position to a closed position when the relay 40 is energized. In its closed position armature 52 locks relay 50 in an energized condition even though second lock control switch 36 returns to its open position after pushbutton Y is activated. Second lock control relay 50 further includes a second armature 54 movable from an initially open position to a closed position when the relay 50 is energized. Lock control switches 34 and 36 are connected in series with power supply 40 and with solenoid 28 so that in use when both switches are actuated, their respective second armatures 48 and 54 move to their closed positions to supply power to solenoid 28. This causes plunger 30 to retract to thereby disable ignition lock override mechanism 23 to permit insertion of ignition key 16 into key slot 18 of key barrel 22.

Switches 38 are connected in parallel with one another and with second lock control switch 36. The parallel arrangement of switches 38 and switch 36 is further connected in series with power supply 40 and with an alarm 56. In use, when any one of switches 38 is actuated, thereby indicating that the proper code combination has not been selected, an alarm control relay 58 is energized, causing a first alarm relay armature 60 to move from an open position to a closed position thereby locking the alarm relay 58 in an energized condition even though the particular switch 38 has returned to its open position after being activated by its respective pushbutton. Alarm control relay 58 further includes a second alarm relay armature movable from an initially open position to a closed position when the alarm relay 58 is energized to activate alarm 56. Preferably, alarm 56 is a conventional automobile horn, although the alarm can be any other type of warning device capable of producing a relatively loud audible signal to indicate that an unauthorized person has selected an improper pushbutton instead of the proper code combination.

The electrical ignition switch control circuit 29 is preferably adapted so that pushbuttons 5 and Y must be punched in sequence to disable override mechanism 23. In use, in the event pushbutton Y is punched without having first punched pushbutton 5, second lock control switch 36 closes to energize lock control relay 50 thereby moving armatures 52 and 54 to their closed positions while armature 46 of first lock control relay 44 remains in its initially closed position so that power is supplied to alarm control relay 58 to energize the relay and sound alarm 56.

The means provided by this invention for sounding alarm 56 in the event an improper code combination is selected can be further adapted to activate anti-theft devices such as a hood lock mechanism or a steering wheel lock.

Assuming that the proper code has been selected to disable override mechanism 23 it becomes desirable to thereafter prevent alarm 56 from being activated so long as ignition key 16 remains in the ingition lock. Thus, a lead line 64 extending away from solenoid 28 is connected to a first interrupting relay 66 having a normally closed relay armature 68 connected in series between the parallel arrangement of switches 38 and alarm control relay 58. When power is supplied to solenoid 28 to disable override mechanism 23, power is also supplied by lead line 64 to energize interrupting relay 66 so that its armature 68 moves to an open position to prevent alarm 56 from being activated so long as plunger 30 remains in its retracted position.

Once the proper code combination has been selected and ignition key 16 is in the ignition lock 10, it may be further desirable to provide a convention warning device such as a buzzer 70 or a panel light (not shown) to notify the operator of the automobile whenever ignition key 16 remains in the ignition lock after the lock is turned to its OFF position. A warning device of this type is shown schematically in FIG. 2 wherein a part of ignition switch 14 is adapted to close when key barrel 22 is rotated to its OFF position. The closing of switch 14 activates buzzer 70 to notify the driver that the key should be removed from the ignition lock. Ignition switch 14 can be further adapted by conventional means to return to its open position to thereby deactivate buzzer 70 when key 16 is removed from the ignition lock. Buzzer 70 can be a separate device as shown in FIG. 2, or it can be combined with a solenoid and plunger into a single unit such as those used in the conventional automobile warning mechanisms which sound when the ignition key is in the OFF or LOCK position.

When key 16 is removed from ignition lock 10, it is further desirable to provide means for returning override mechanism 23 to its initial position shown in FIG. 2. Thus, a normally open reset switch 72, adapted by conventional means to move to a closed position when ignition switch 14 returns to its open position, energizes a second interrupting relay 74 when closed. A normally closed armature 76 of interrupting relay 74 moves to an open position when the relay 74 is energized so that power supplied to first lock control relay 44 and second lock control relay 50 is momentarily interrupted, thereby permitting both armatures of each relay to return to their original positions shown in FIG. 2. Since power is supplied to solenoid 28 through armatures 46 and 52 or lock control relays 44 and 50, respectively, the closing of reset switch 72 also cuts off power to solenoid 28, so that plunger 30 moves from its retracted position to its normal extended position cooperating with metal ball 24 to prevent insertion of key 16 into key barrel 22 of ignition lock 10.

It has been seen that code combination 5-Y must be punched in sequence to disable override mechanism 23. Since lock control switches 34 and 36 are connected in series with power source 40 and solenoid 28, it is necessary to provide means for preventing solenoid 28 from being energized in the event the improper combination Y-C is selected It is further necessary to prevent the solenoid from being energized in the event pushbuttons 5 and Y are selected in the proper sequence but with one or more intervening incorrect pushbuttons, such as the combination 5-A-Y. In both of these example situations, selection of the improper pushbuttons Y and A, respectively, activates alarm 56 in the manner previously described. A lead line 78 leading from the alarm supplies power to second interrupting relay 74 to maintain the relay in its energized condition so long as alarm 56 remains activated. Thus, armature 76 of relay 74 remains in its open position to cut off the supply of power to lock control relays 44 and 50. This prevents power from being supplied to solenoid 28 and therefore maintains the solenoid in its normally extended position to prevent override mechanism 23 from being disabled so long as alarm 56 remains activated. A normally open switch 80 is provided in parallel with reset switch 72 so that an authorized person, i.e., one who has key 16 and knows the code for circuit 29, may disable alarm 56 in the event he inadvertently selects the wrong ones of sensing devices 20 in operating the system. Switch 80 is preferably located at some inconvenient location, such as in the automobile luggage compartment. The presence of switch 80 is of no aid to an unauthorized person who may possess key 16 but not know the code for circuit 29.

Override mechanism 23 of this invention provides means for substantially reducing the cost of manufacturing ignition lock mechanisms for automobiles. That is, the same key slot, suitably contoured, can be used for all automobile ignition locks. The contour of the key slot would not match the contour of the particular automobile door key, except that in use the door key would be capable of rotating the key barrel once the override mechanism is disabled by punching the proper code and the door key is inserted into the slot.

FIGS. 4 through 8 show means for operating the ignition switch control and alarm system with a dummy key 82. The dummy key is provided for parking attendant's use and can be left in the ignition when parking the automobile in a parking lot or parking garage. It is desirable to stamp the owner's secret code onto the ignition key 16 for reminder purposes. However, when having his automobile parked, the owner does not wish to reveal his secret code to a parking attendant. Thus, the dummy key can be left in the key barrel in place of the ignition key so that the attendant can move the automobile while the owner is gone. The dummy key does not have the conventional teeth, as shown in FIG. 7, so it cannot be used to operate door locks of the automobile.

The key barrel 22 is mounted within an outer cylindrical barrel 84. In use, the key barrel turns relative to the outer barrel when the operator rotates the ignition key 16, or the dummy key 82, inserted in the key slot 18 of the key barrel. The key barrel preferably rotates relative to the outer barrel between "lock", "off", "on", and "start" positions in the well known manner which is commonly used in automobiles manufactured by General Motors Corporation.

FIG. 4 shows the key barrel aligned within the outer barrel in the lock position. In this position, the key barrel has channel 26 aligned with a cooperating channel 26' in the outer barrel. The plunger 30 is mounted adjacent to the outer barrel, so that when the solenoid 28 is not energized the plunger extends outwardly, as shown in FIG. 4, to hold the ball 24 in the slot formed by channels 26 and 26'. As shown best in FIG. 5, when the key barrel 22 is in the lock position the ball 24 both prevents insertion of the ignition key or the dummy key and prevents rotation of the key barrel relative to the outer barrel. Thus, when the secret code is punched into the ignition override mechanism 23, the plunger is retracted, and the ignition key then may be inserted into key slot 18. When the key is inserted into the key slot, ball 24 is forced upwardly into channel 26' to permit the key barrel to be rotated from lock position to the start position to start the automobile engine.

The key barrel 22 has an elongated slot 86 formed in its upper surface. The slot 86 is spaced forwardly of channel 26, as shown in FIG. 4, with the right end portion of the slot, when viewing it from the front as in FIG. 6, aligned longitudinally with channel 26. A channel 88 is formed in outer barrel 84 at a point spaced forwardly and to the right of channel 26', when viewing the barrel 84 from the front, as in FIG. 6. When key barrel 22 is mounted within the outer barrel in the lock position, the channel 88 is laterally aligned with and spaced slightly from the right edge of slot 86. When the key barrel is rotated one position to the off position, as shown in FIG. 8, the right end portion of slot 86 registers with channel 88. A second locking member, preferably a second metal ball 90, is disposed within channel 88 of the outer barrel. When the key barrel is in the lock position shown in FIG. 6, the ball 90 rides on the outer surface of the key barrel. When rotating the key barrel to the off position, the ball 90 is urged into engagement with the registering slot 86 by a biasing spring 92 which applies a biasing force on the ball 90 toward the key barrel.

In use, when leaving the automobile at a parking lot or parking garage, the owner removes the ignition key from the key slot and inserts the dummy key. (The dummy key cannot be inserted into the key slot when the key barrel is in lock position without first punching the secret code into the override mechanism to disable the plunger 30 and ball 24. However, the dummy key may be inserted immediately into the key slot when the key barrel is in the off position, because the tapered front end 94 of the dummy key forces the ball 90 upwardly in channel 88 against the force of biasing spring 92.) With the dummy key, the attendant can turn the key barrel to start position to move the automobile to various desired locations. Alternatively, the key barrel can have outwardly projecting lobes 96 for use in turning the key barrel between off and start positions when a key is not present in the key slot. In the latter case, since the ball 90 is not forced upwardly into the channel 88 by a key, the ball 90 rides in slot 86 as the key barrel is rotated between off position and start position.

When the key barrel 22 is in the off position shown in FIG. 7, the ball 90 prevents the key barrel from being turned in a counterclockwise direction to the lock position as long as a key is not present in the key slot. If the ignition key or dummy key is inserted into the key slot, the ball 90 is forced upwardly in channel 88 to permit the key barrel to be turned to the lock position. Thus, if the dummy key is left in the key slot when parking the automobile, the parking attendant can use the dummy key to turn the key barrel to the lock position when he is ready to close the parking lot or parking garage. The dummy key is then removed from the key slot, which permits the ball 24 and plunger 30 to lock the key barrel against rotation relative to the outer barrel. When the owner arrives, he unlocks the door of the automobile, punches the proper code to disable the override mechanism, and inserts the ignition key to start the automobile.

FIGS. 9 through 12 show an alternate key barrel 22' which provides an alternate arrangement for operating the ignition switch control and alarm system using dummy key 82. In this system, plunger 30 operates the same way as described above for FIGS. 4 through 8, i.e., to hold ball 24 in channels 26' and 26 (see FIG. 12) when key barrel 22' is in the lock position, to prevent turning of the key barrel until such time that the proper ignition override code is punched. (FIG. 12 shows key barrel 22' in the lock position, with plunger 30 blocking passage of ignition key 16 because the proper code has not yet been punched.) Moreover, key barrel 22' is in a modified outer barrel 84' which includes the same channel 88 for guiding movement of ball 90.

Key barrel 22' has an elongated slot 98 extending through its upper surface. This slot is in the same place as channel 86 of key barrel 22, i.e., slot 98 is aligned vertically with channel 88 in the outer barrel. However, the front portions of key barrel 22' and outer barrel 84' have enlarged sections 99 and 99', respectively. As shown best in FIG. 12, this arrangement makes channel 88 offset vertically from channel 26', and slot 98 offset vertically from channel 26. The purpose of the offset will be described in detail below.

Slot 98 includes a large portion 100 at its right side (when viewed in FIGS. 9 through 12). The large portion 100 is sized slightly larger than ball 90, so that the ball does not protrude into channel 88 or contact outer barrel 84 when it is positioned in large portion 100 of the slot (see FIG. 11). Slot 98 also includes an arcuate portion 102 leading into enlarged portion 100, the arcuate portion being shallower than the large portion. Thus, when ball 90 is in the arcuate portion of the slot, it protrudes upwardly into channel 88 of the key barrel (see FIG. 10).

In using the alternate ignition switch control system of FIGS. 9 through 12, the automobile owner inserts his, or her, ignition key (not shown) into key barrel 22' to start the engine. After the engine is started the key returns to the on position, as is well known. As shown in FIG. 13, the ignition system of FIGS. 9 through 12 is arranged to activate a solenoid operated buzzer 104 when the ignition key is in the on position to remind the automobile owner to remove the key immediately from the key barrel slot 18' and put the key in his pocket, purse, or the like. Preferably, the system operates as any conventional automobile warning system, whereby a switch 106 is closed when the key barrel is in the lock position to supply voltage from a power source 108 to the buzzer to sound the buzzer and remind the owner to remove the ignition key. A second switch 110 also is closed to sound buzzer 104 when the key barrel is in the on position, the reason for this arrangement being described in detail below. The solenoid buzzer may be activated in the manner disclosed in my U.S. Pat. No. 3,541,505, although other means for activating the buzzer may be used without departing from the scope of the invention.

Key barrel 22' is provided with lobes (not shown) similar to lobes 96 for use in manually turning key barrel 22' relative to outer barrel 84'. When the automobile owner has to turn his engine off, he simply uses the lobes to turn key barrel 22' to the lock position. This of course activates the ignition override system described previously to cause solenoid plunger 30 to move forward and hold ball 24 in channel 26 to lock the key barrel against rotation.

As shown in FIG. 11, ball 90 is able to ride in large portion 100 of slot 98 when key barrel 22' is turned from the on position to the lock position. Thus, the ball does not interfere with rotation of key barrel 22' relative to the outer barrel 84'. Accordingly, the automobile owner is able to turn the key barrel, with the aid of the lobes, from the off position through the start position and back to the lock position. (As previously described, ignition key 16 must be inserted into key slot 18' to force ball 24 upwardly into channel 26', after the ignition code is punched, to turn key barrel 22' from the lock position to the off position. Ball 90 does not prevent the ignition key from being inserted when key barrel 22' is in the lock position. The vertical offset of ball 90, as shown in FIG. 12, allows ignition key 16 to enter key slot 18', the only obstruction being provided by ball 24, which blocks the key as long as the ignition override code is not punched.)

When the automobile owner parks the automobile in a parking lot or the like, he inserts dummy key 82 into key slot 18', preferably when the key barrel is in the off position. The dummy key also can be inserted when the key barrel is in the on position. The dummy key is used so the parking attendant cannot accidentally turn key barrel 22' to the lock position. That is, dummy key 82 is shaped such that it forces ball 90 to a position in both the lower portion of channel 92 and the upper portion of enlarged portion 100 of slot 98, when key barrel 22' is in the off position shown in FIG. 9. In this position, the ball prevents rotation of key barrel 22' relative to outer barrel 84' in the counterclockwise direction shown in FIG. 9. Thus, as long as the dummy key is present in the ignition, the parking attendant may start the engine of the automobile whenever he desires to move the automobile to different locations in the parking area. He is also able to turn the engine off when each time the automobile is parked. However, he cannot accidentally lock key barrel 22' as long as the dummy key is present.

As shown in FIG. 10, the parking attendant can turn key barrel 22' from the off position through the start position when the dummy key is present in the key slot. Ball 90 rides in arcuate portion 102 of slot 98, which permits rotation of key barrel 22' relative to outer barrel 84.

When the parking attendant wishes to lock the automobile, he removes the dummy key and turns key barrel 22', with the aid of the lobes, to the lock position. The dummy key is allowed to dangle by means of a ball chain or the like for connecting the dummy key to the lobes (see FIG. 8) or other portion of the automobile dashboard. As shown in FIG. 11, removal of the dummy key allows ball 90 to fall into enlarged portion 100 of slot 98 so that the ball does not prevent rotation of key barrel 22' relative to outer barrel 84 when the lobes are used to turn the key barrel.

When the automobile owner arrives, he unlocks the door of the automobile, punches the proper code to disable the override mechanism, i.e, plunger 30, and inserts the ignition key to start the engine. As described above, ball 90 does not prevent the ignition key from being inserted because of the vertical offset from ball 24.

It is recognized that various forms of the ignition switch control and alarm system can be used without departing from the scope of the invention. For example, various arrangements may be used to prevent a parking attendant or the like from accidentally turning key barrel 22' to the lock position until it is desired to lock the automobile. Moreover, the warning system shown in FIG. 13 may be modified to sound the buzzer when the key is in the start position or the off position. In this instance, the solenoid buzzer unit may be constructed so it may be simply turned to a given position to adjust the position at which it is sounded.

I claim:

1. Apparatus for controlling the insertion of a key into a key operated automobile ignition lock of an automobile ignition system, the apparatus comprising:
   a. a plurality of selectively operable sensing means defining properly selected sensing means and improperly selected sensing means;
   b. a key barrel coupled with the automobile ignition system and adapted to receive a key;
   c. an outer barrel in which the key barrel is disposed;
   d. locking means movable between a normally locked position preventing turning of the key barrel relative to the outer barrel and an unlocked position permitting turning of the key barrel relative to the outer barrel; and
   e. electrical lock control means operable in response to actuation of the properly selected sensing means to move the locking means from its normally locked position to it unlocked position to thereby allow a key to be inserted into the key barrel and the key barrel to be turned relative to the outer barrel.

2. Apparatus according to claim 1 in which the key barrel is in a first predetermined position relative to the outer barrel when the locking means prevents turning of the key barrel relative to the outer barrel; and further including second locking means defining a locked position which prevents turning of the key barrel relative to the outer barrel when the key barrel is in a second predetermined position relative to the outer barrel, the second locking means being operable in response to actuation by a dummy key to permit rotation of the key barrel relative to the outer barrel from the second predetermined position.

3. Apparatus according to claim 1 in which the key barrel is in a first predetermined position relative to the outer barrel when the locking means prevents turning of the key barrel relative to the outer barrel; and further including second locking means defining a locked position which prevents turning of the key barrel relative to the outer barrel when the key barrel is in a second predetermined position relative to the outer barrel and when a dummy key is present in the key barrel to actuate the second locking means, the second locking means being operable in response to removal of the dummy key from the key barrel to permit rotation of the key barrel relative to the outer barrel from the second predetermined position.

4. Apparatus according to claim 3 in which the position of the key barrel relative to the outer barrel defines a third predetermined position in which the engine of the automobile is on, and including means for sounding an alarm when a key is in the key barrel when the latter is in the third predetermined position.

* * * * *